(12) United States Patent
Fisher et al.

(10) Patent No.: US 7,740,157 B2
(45) Date of Patent: Jun. 22, 2010

(54) COORDINATED LATCHING MECHANISM FOR CAR TOP CARRIER

(75) Inventors: Dave Fisher, McKinleyville, CA (US); Joseph J. Settelmayer, Fieldbrook, CA (US)

(73) Assignee: Yakima Products, Inc., Beaverton, OR (US)

( * ) Notice: Subject to any disclaimer, the term of this patent is extended or adjusted under 35 U.S.C. 154(b) by 686 days.

(21) Appl. No.: 11/657,704

(22) Filed: Jan. 23, 2007

(65) Prior Publication Data

US 2007/0257075 A1    Nov. 8, 2007

Related U.S. Application Data

(60) Provisional application No. 60/762,215, filed on Jan. 23, 2006.

(51) Int. Cl.
*B60R 9/055* (2006.01)
(52) U.S. Cl. .................. 224/328; 224/319; 16/232
(58) Field of Classification Search ........... 224/315, 224/319, 328; 70/69, 70, 71; 292/32, 38, 292/42, 340, 341.15; 16/231, 232
See application file for complete search history.

(56) References Cited

U.S. PATENT DOCUMENTS

| 3,008,177 | A | * | 11/1961 | Wooten, Jr. ................... 16/224 |
| 3,640,423 | A | * | 2/1972 | Parker et al. ................. 220/324 |
| 4,503,584 | A | * | 3/1985 | Malchow ..................... 16/232 |
| 5,546,705 | A | * | 8/1996 | Hirtsiefer .................... 49/386 |
| 5,647,652 | A | * | 7/1997 | Zalewski et al. ............. 312/324 |
| 5,823,411 | A | * | 10/1998 | Gronwoldt et al. ........... 224/328 |
| 7,040,675 | B1 | * | 5/2006 | Ott et al. ..................... 292/216 |
| 7,352,566 | B2 | * | 4/2008 | Huang et al. ........... 361/679.55 |
| 7,416,098 | B2 | * | 8/2008 | Settelmayer et al. ........ 224/319 |
| 7,503,470 | B2 | * | 3/2009 | Settelmayer et al. ........ 224/319 |

FOREIGN PATENT DOCUMENTS

EP    1231112 A2 *  8/2002
JP    2003089329 A *  3/2003

* cited by examiner

*Primary Examiner*—Nathan J Newhouse
*Assistant Examiner*—Justin M Larson
(74) *Attorney, Agent, or Firm*—Kolisch Hartwell, P.C.

(57) ABSTRACT

A cargo box has a bottom portion and a lid. The lid is hinged to the bottom to allow opening on one or more sides. Operation of opening and closing multiple latches is coordinated by an external handle and internal bar assembly.

7 Claims, 6 Drawing Sheets

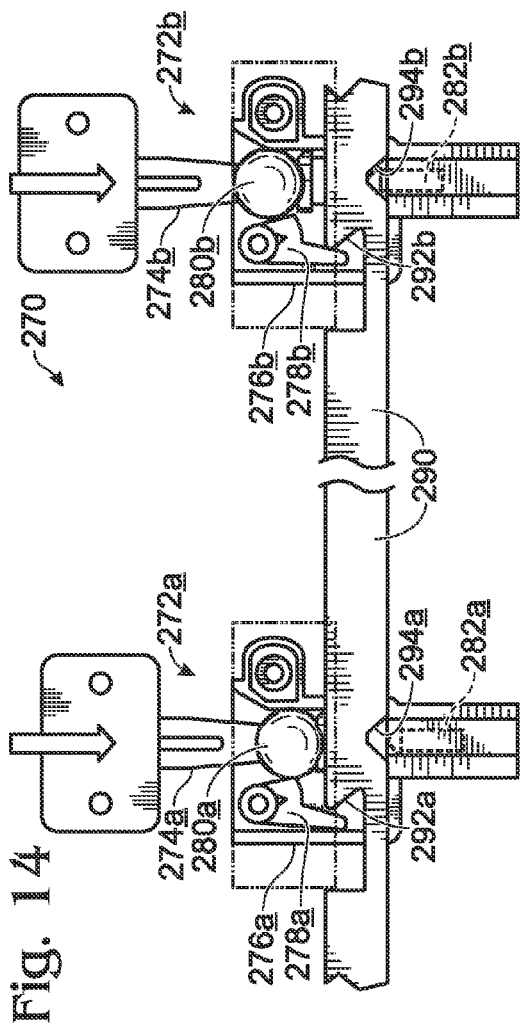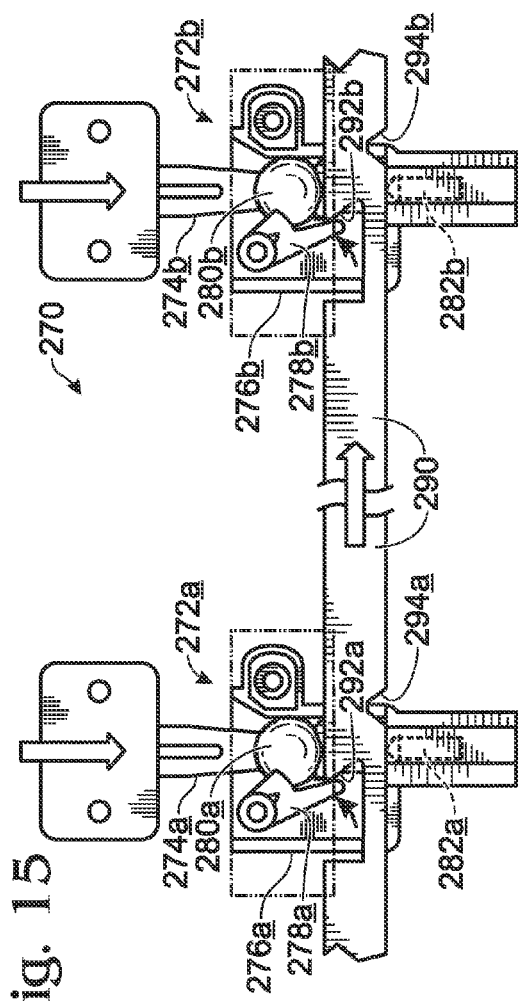

COORDINATED LATCHING MECHANISM FOR CAR TOP CARRIER

CROSS-REFERENCE TO RELATED APPLICATIONS

This application is based upon and claims priority under 35 U.S.C. §119 from U.S. Provisional Patent Application Ser. No. 60/762,215 filed Jan. 23, 2006, which is incorporated herein by reference in its entirety for all purposes.

This application also incorporates by reference in their entirety for all purposes the following U.S. Pat. No. 6,905,053 issued Jun. 14, 2005; and U.S. Pat. No. 6,918,521 issued Jul. 19, 2005. This application also incorporates by reference in their entirety for all purposes the following U.S. patent applications: Ser. No. 10/767,398 filed Jan. 28, 2004; and Ser. No. 11/219,578, filed Sep. 2, 2005.

BACKGROUND

Enclosed car top carriers such as boxes or trunks have become quite popular for carrying cargo. As fuel becomes more expensive, cars become smaller, and interior cargo space decreases. At the same time the amount of gear and equipment that people carry on their travels keeps increasing, making the demand for reliable, easy-to-use external cargo carriers even greater. Enclosed carriers are often preferable over conventional open racks for a variety of reasons. For example, enclosed carriers protect cargo from the elements such as wind, rain, and snow, and are more secure from theft or vandalism.

However, some car top carriers have problems which make them difficult or cumbersome to use. Some boxes are difficult to open or close properly. Sometimes it is difficult for the operator to know when the box is completely closed and secured. Typically, there are several latches on a side of the box that opens. The user may have to operate multiple separated latches simultaneously. This may require substantial strength, dexterity, and reach. Some boxes have an actuator that coordinates simultaneous release of multiple latches, but still may require special handling such as lifting of the cover while manipulating the actuator or handle. Similarly, carriers may be difficult to close securely, because in some instances, the user may not know whether each separate latch mechanism is properly engaged when closing the box.

Some of the aforementioned problems were addressed in pending U.S. patent application Ser. No. 11/219,578 filed Sep. 2, 2005 for a CAR TOP CARRIER, which is a divisional application of U.S. patent application Ser. No. 10/767,398 filed Jan. 28, 2004, which is based upon and claims priority under 35 U.S.C. §119 from U.S. Provisional Patent Application Ser. No. 60/443,487 filed Jan. 28, 2003 and from U.S. patent application Ser. No. 10/662,123 filed Sep. 11, 2003. All of these references are incorporated herein by reference in their entirety for all purposes. Also incorporated by reference in its entirety for all purposes is Provisional Application Ser. No. 60/719,503 filed Oct. 21, 2005. Needs still exist for improved enclosed car top carriers that are easy to use and reliable.

BRIEF DESCRIPTION OF DRAWINGS

FIGS. 12-15 show partial front views of plural hinge/latches in various positions coordinated by a common actuating bar.

DESCRIPTION OF THE INVENTION

Figure 1:
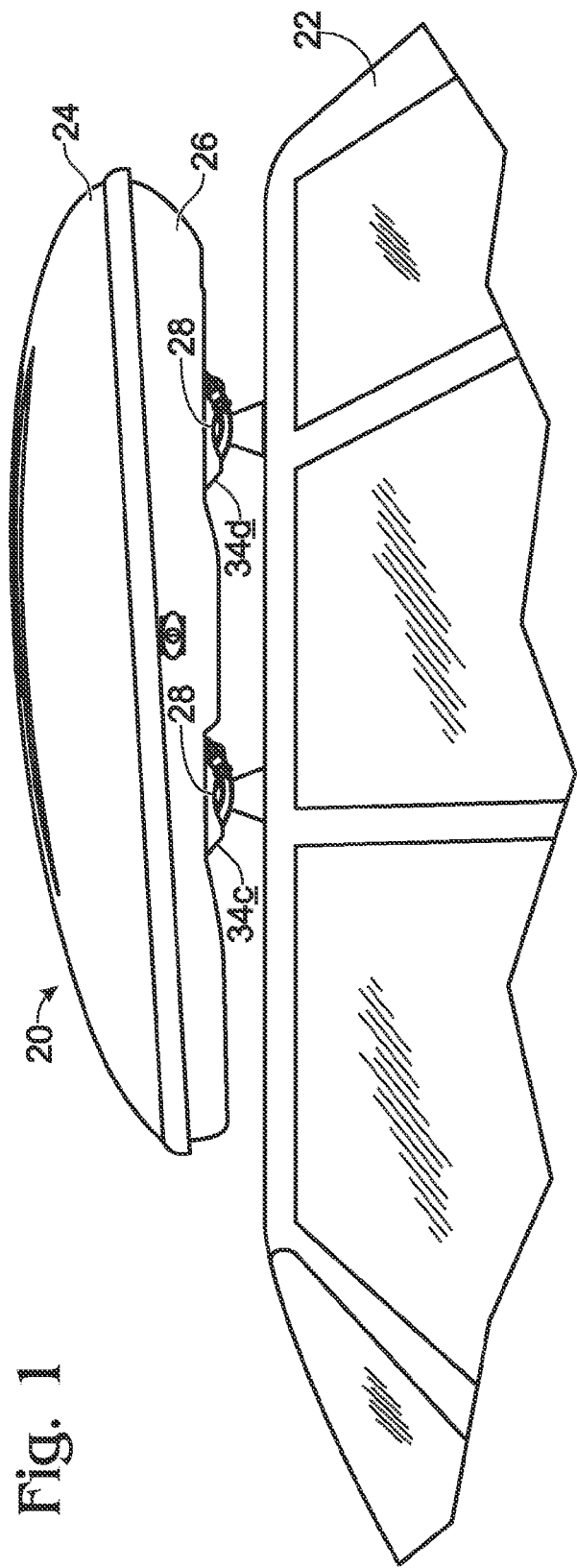
FIG. 1 is a side view of a car top carrier mounted on a vehicle.

FIG. 1 shows car top carrier 20 mounted on vehicle 22. Car top carrier 20 includes top 24 and bottom 26 mounted on crossbars 28 on the top of car 22.

Figure 2:
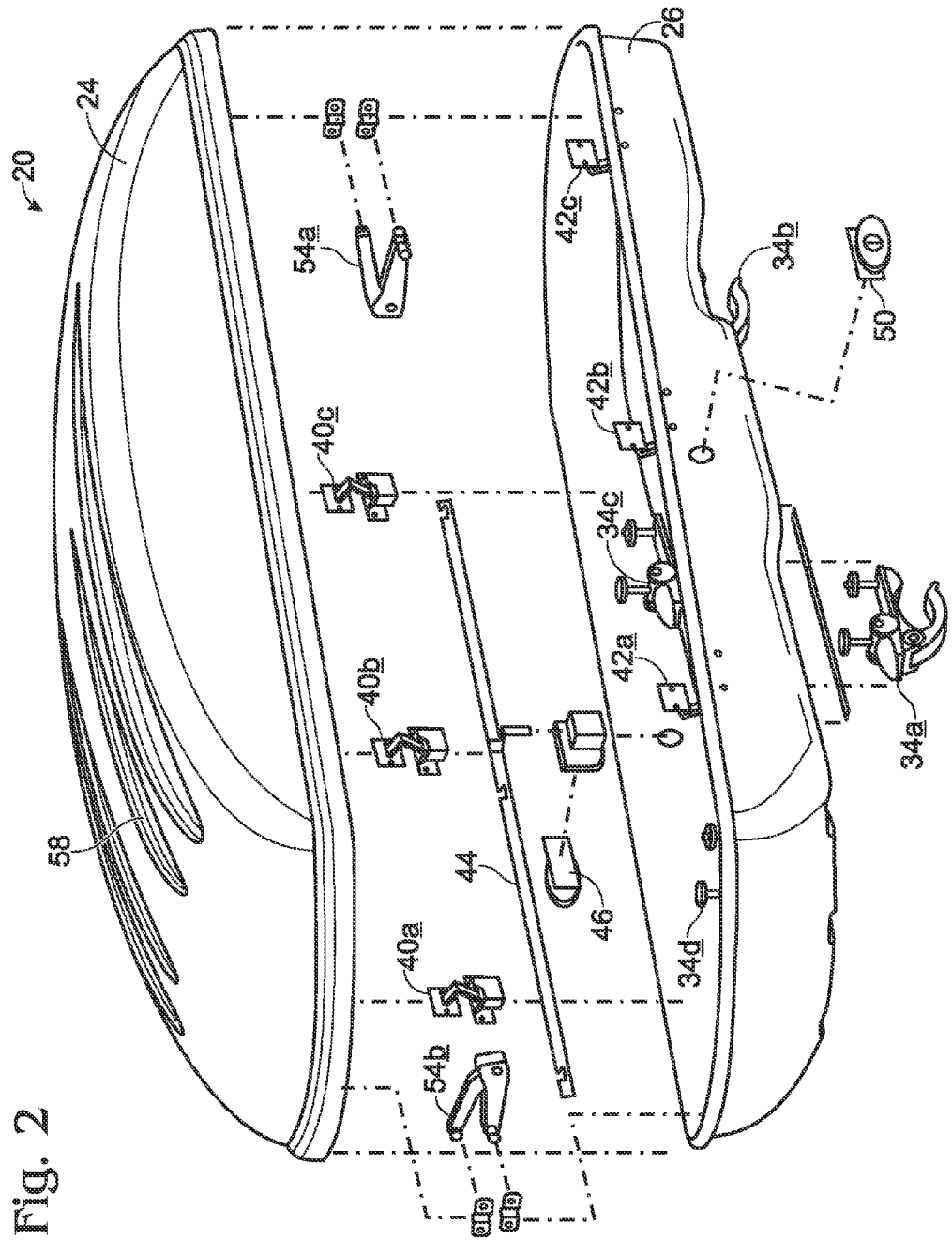
FIG. 2 is an exploded view of a car top carrier.

FIG. 2 shows an exploded view of car top carrier or box 20. Mounting hardware is provided for easily securing carrier 20 to the vehicle rack. For example, four mounting mechanisms 34*a-d* may be provided for this purpose. Each mounting mechanism includes a cam lever for operating a jaw mechanism to clamp around a crossbar, as explained in more detail below. The clamps may be provided completely preassembled with the box. The clamps never need to be disassembled as the carrier is put on and off one or more cars through the life of the product. Each clamp may be adjustable to grip, with variable force, crossbars of different dimensions. The clamps may also be adjustable to different locations on the floor of the box, for example, along an axis parallel to the direction of vehicle travel. The clamps are preferably configured so that once the carrier clamps are adjusted for a particular vehicle configuration, the carrier can be easily installed or removed by simply manipulating each cam lever with a single, one step, switch, toggle, rotation, stroke or other quick-action, for example, with an over-center assist mechanism.

Sets of hinge/latch mechanisms may also be provided on each side of carrier 20 to allow opening of the carrier from opposite sides. In FIG. 2, hinge/latch mechanisms 40*a*-40*c* are mounted on one side of carrier 20 to connect top 24 to bottom 26. Similarly, on the other side of carrier 20, hinge/latch mechanisms 42*a*-42*c* connect top 24 to bottom 26. Actuating bar 44 is mounted inside carrier 20 for operating and synchronizing hinge/latch function of mechanisms 40*a*-40*c*. Actuating bar 44 may be operated, i.e., moved forward and backward relative to the long axis of carrier 20, by manipulating switch, handle, or key device 46 from the exterior of carrier 20. A similar actuating bar (not shown) is used to operate hinge/latch mechanisms 42*a-c* via switch, handle, or key device 50.

Lid supports 54*a* and 54*b* are mounted at the front and back ends of carrier 20, connecting top 24 to bottom 26. Lid supports 54*a* and 54*b* stabilize top 24 when moving between open and closed positions. Lid supports 54*a* and 54*b* may also limit the extent of potential opening of carrier 20. For example, lid supports 54*a*, 54*b*, may limit the extent of opening on either side of carrier 20 to approximately 16-inches. Longitudinal ribs or indentations 58 may be formed in carrier top 24 to provide stiffening and increased strength for carrier 20, and may also be desirable aesthetically.

Figure 3:
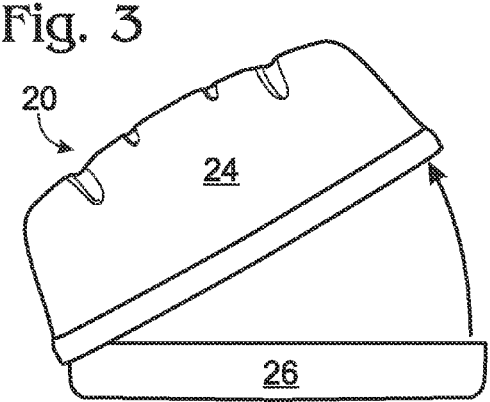
FIGS. 3 and 4 are end views of a car top carrier opened on opposing sides.
Figure 4:
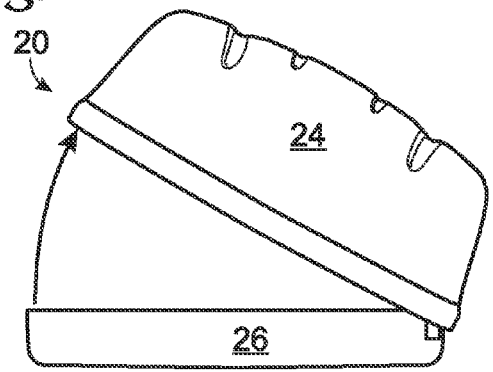

FIGS. 3 and 4 show end views of car top carrier 20 opened alternately from opposite sides. This feature of carrier 20 is made possible by dual-functioning hinge/latch mechanisms such as the examples described in detail below.

Figure 5:
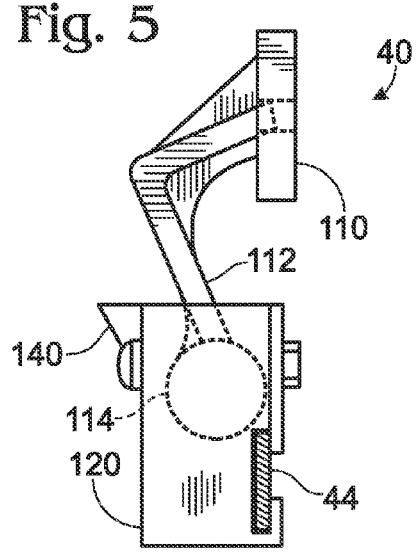
FIGS. 5-7 are isolated side views of a hinge/latch in various positions.
Figure 6:
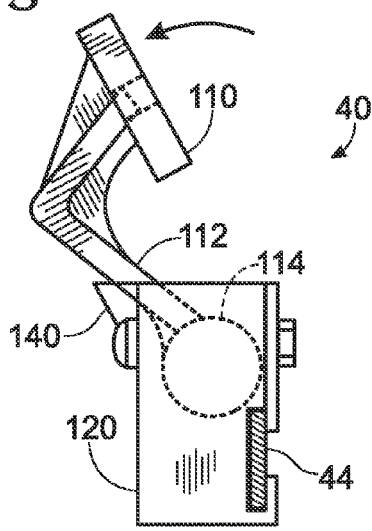
Figure 7:
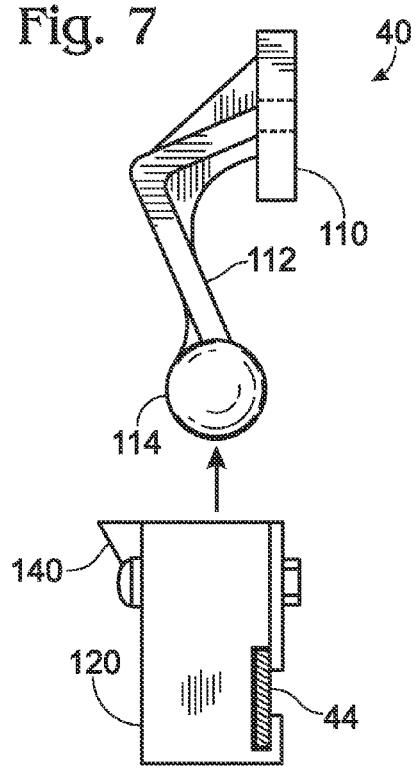

FIGS. 5-7 are side views of a hinge/latch mechanism, for example, like 40a-c and 42a-c in FIG. 2. Mounting base, platform, or portion 110 may be securely fastened, for example, by screws to 24 of carrier 20. Receiving portion 120 may be fastened securely to a corresponding location on bottom 26 of carrier 20. In FIG. 5 hinge/latch mechanism 40a is oriented in position for securing top 32 to bottom 34 when carrier 20 is closed. FIG. 6 shows the orientation of hinge/latch mechanism 40 when the hinge/latch mechanisms on the opposite side of the box are functioning as a latch. Flared portion 140 of receiving portion 120 permits a selected degree of motion of arm portion 112 relative to receiving portion 120. FIG. 7 shows hinge/latch mechanism 40 operating as a latch after enlarged end portion 114 has been released from receiving portion 120.

Figure 8:
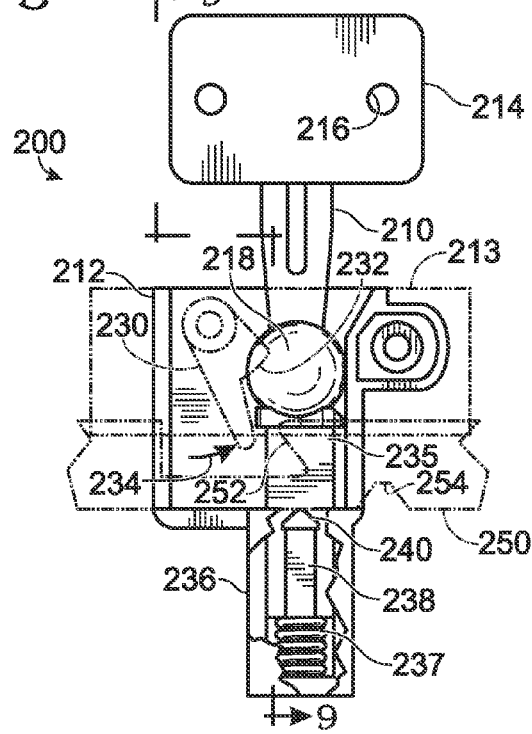
FIG. 8 is a partial cut-away front view of a hinge/latch in the closed position.
Figure 9:
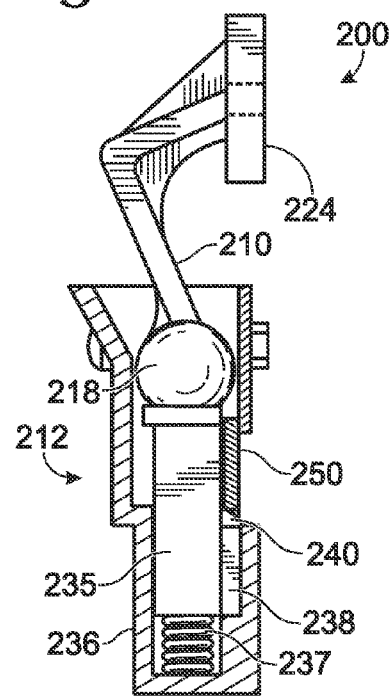
FIG. 9 is a cross sectional view through the view shown in FIG. 8.

FIGS. 8 and 9 show sectional views through hinge/latch assembly 200. Hinge/latch 200 includes male portion 210 engaged with female portion 212. Female portion 212 is attached to a bottom portion of a box. Male portion 210 includes mounting plate 214 which has holes 216 for securing mounting plate 214 on either a lid or a bottom portion of the box. Male portion or piece 210 has a rounded or substantially spherical end portion 218 (also referred to as an "enlarged portion") adapted for retention inside female portion or piece 212. Female portion 212 has a spring-biased pivoting pawl 230 with a nub formation configured to retain spherical end portion 218 when pawl 230 is in a closed position. Pawl 230 is spring-biased in the direction of arrow 234. Female portion 212 also contains plunger 235 which is seated in chamber or cavity 236. Spring 237 urges plunger 235 upward resulting in an upward force placed on spherical end portion 218 of male piece 210. Plunger 235 has an elongate protrusion or ridge structure 238 with a cap portion 240.

Figure 10:
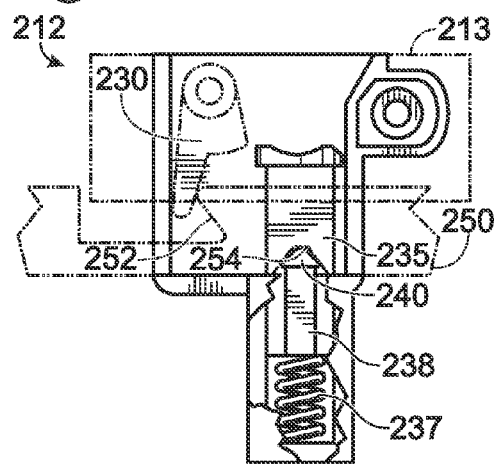
FIG. 10 is a partial cut-away front view of a hinge/latch in the open position.

Bar 250, shown in dashed lines in FIG. 8, is used to coordinate opening and closing action of multiple hinge/latches. For each hinge/latch assembly, bar 250 has an elbow structure 252 for contacting and moving pawl 230 clockwise toward an open position when bar 250 is moved horizontally to the left as shown in FIG. 10. Bar 250 also has notch 254 for receiving cap portion 240 of protrusion 238 when the two structures are aligned. Alignment of cap portion 240 and notch 254 occurs when bar 250 has moved horizontally a sufficient distance to rotate pawl 230 into an open position, thereby allowing plunger 235 to push or pop spherical end portion 218 out of engagement with female portion 212.

FIG. 9 shows a cross-sectional view of the structure shown in FIG. 8. Protrusion 238 and cap portion 240 are maintained below bar 250, thus allowing bar 250 to be moved horizontally in response to rotation of a handle (not shown) on an exterior side of the box. As long as protrusion 238 is retained below bar 250, plunger 235 is prevented from pushing end portion 218 out of female portion 212.

Figure 11:
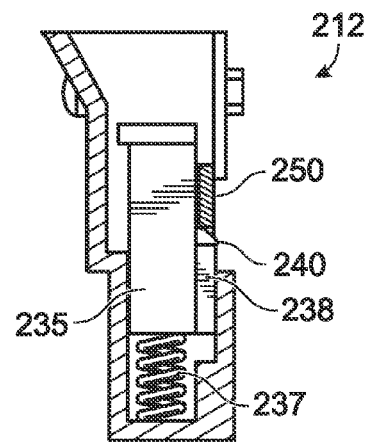
FIG. 11 is a cross-sectional view through the view shown in FIG. 10.

FIGS. 10 and 11 are similar views to FIGS. 8 and 9, except bar 250 has been moved horizontally to the left so that protrusion 238 of plunger 235 is aligned with notch 254 of bar 250. Pawl 230 has been rotated by force from elbow structure 252 of bar 250 into an open position. Simultaneously, plunger 235 is permitted to move upward by a distance approximately equal to the height of notch 254, thereby popping end portion 218 of male portion 210 out of female portion 212. FIG. 11 shows a sectional view of the structure shown in FIG. 10. Cap portion 240 of protrusion 238 has moved upward, relative to the analogous view shown in FIG. 9, into notch 254 of bar 250. Plunger 235 has moved upward by a corresponding distance.

FIGS. 12-15 show how a single bar device coordinates unlatching and relatching of multiple hinge/latch assemblies. FIG. 12-15 show coordination of two hinge/latch assemblies. However, the same concepts may be easily applied to coordinate operation of other numbers of hinge/latch assemblies. For example, in a preferred box design, three hinge/latch assemblies are coordinated on each side of a box by a single bar.

Figure 12:
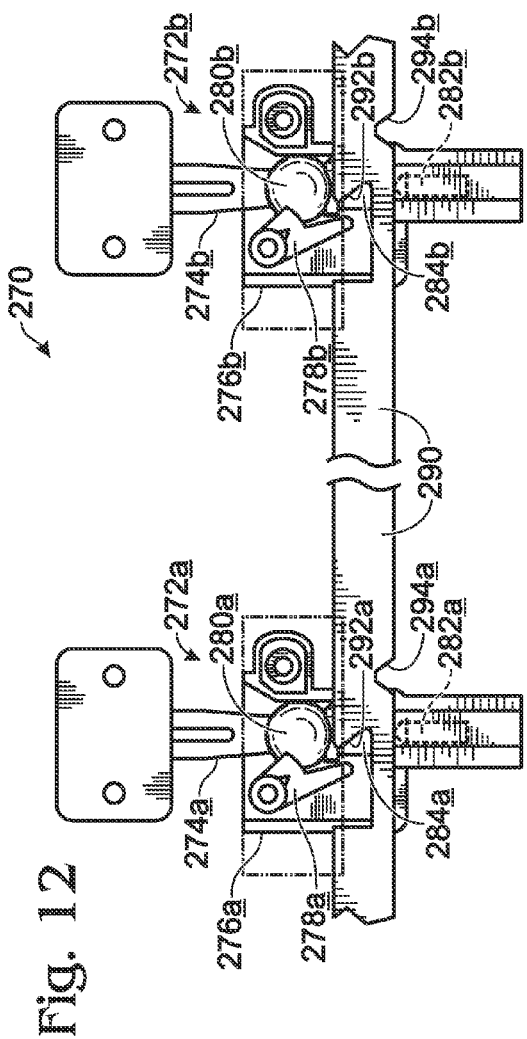

As shown in FIG. 12, coordinated hinge/latch assembly system 270 includes hinge/latch assemblies 272a, 272b. It may be assumed that the following description of hinge/latch assembly 272a applies similarly to hinge/latch assembly 272b, however, referring to the same numbers, except with b instead of a. In FIG. 12, hinge/latch assembly system 270 is retaining the lid of the box in a closed position. In this position the box could be opened from the other side, in which case, the hinge/latch assembly system 270 would permit hinging of the lid. Male pieces 274a, 274b are engaged to female pieces 276a, 276b, respectively. Pawls 278a, 278b are biased into a closed position, thereby touching and retaining spherical end portions 280a, 280b, respectively. Protrusions 282a, 282b and plungers 284a, 284b, respectively, are shown in dashed lines. Plungers 284a, 284b are held in a depressed position because protrusions 282a, 282b contact the edge of bar 290. Bar 290 has an elbow structure and a notch for each hinge/latch assembly. As shown, in FIG. 12, bar 290 includes elbow structures 284a, 284b, and notches 294a, 294b for coordinating hinge/latch assembly operation.

Figure 13:
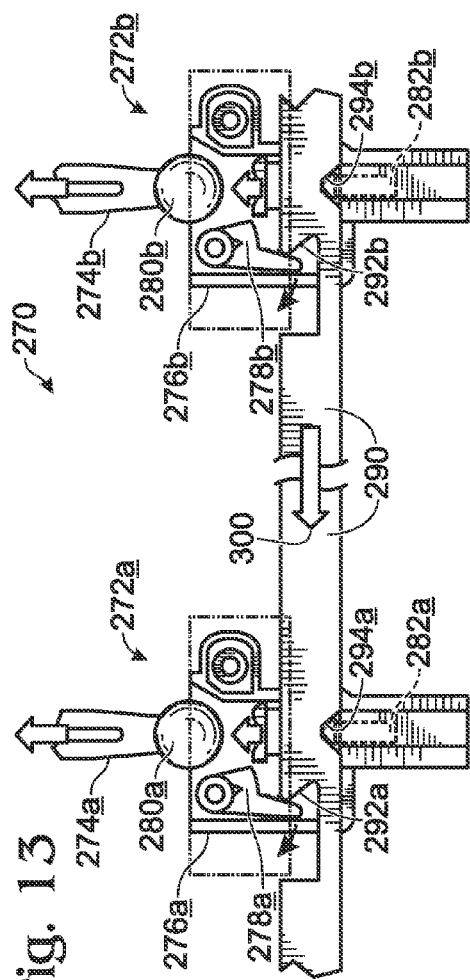

In FIG. 12, hinge/latch assemblies 272a, 272b are in the closed position. In FIG. 13 a handle (not shown) has been rotated by a user causing bar 290 to move horizontally in the direction of arrow 300. The movement of bar 290 has caused elbow structures 292a, 292b to push respective pawls 278a, 278b in a clockwise rotation toward an open position, allowing spherical end portion 280a, 280b to pop out of engagement with female pieces 276a, 276b. At the same time, protrusions 282a, 282b have moved into respective slots or notches 294a, 294b, which has also permitted plungers 284a, 284b to move upward assisting exit of the male pieces.

Engagement of protrusions 282a, 282b in notches 294a, 294b prevents further horizontal movement of bar 290 in either direction until all of the protrusions have been cleared from respective notches. Accordingly, as shown in FIG. 14, protrusion 282a has been cleared from notch 294a by applying downward (closing) pressure on the plunger from male piece 274a. However, in hinge/latch assembly 272b, male piece 274b has not moved downward sufficiently to clear protrusion 282b from notch 294b. Therefore, bar 290 is not permitted to move horizontally back to a closed position, i.e., allowing pawls 278a, 278b to rotate counterclockwise back to a closed position. Further, in the positions shown in FIG. 14, the external handle would not be permitted to rotate back to its closed position, thereby providing visual information to the user that the lid is not completely secured.

FIG. 15 shows the result of further downward pressure on male piece 274b causing plunger 284b to move downward sufficiently so that protrusion 282b is clear from notch 294b, thus allowing pawls 278a, 278b to rotate back to closed positions, retaining spherical end portions 280a, 280b and urging bar 290 in the direction of arrow 310. In the positions shown in FIG. 15, the external handle would be permitted to rotate back to its closed position so the user knows that the lid is completely secure.

Although vehicle top carriers and features of vehicle top carriers have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

Illustrative examples have been shown and described relating to a box that opens on two sides, and therefore used dual functioning hinge/latches. However, feature and elements, of the described examples may be implemented advantageously in a box that only opens on one side. A similar coordinating bar device could be used to coordinate action between multiple latches that do not function as hinges.

We claim:

1. A carrier for transporting cargo on top of a vehicle comprising
    a box having a bottom and a lid hinged to the bottom, the box having first and second opposing lateral sides,
    plural catch assemblies spaced along the first side of the box, each catch having a female piece and a male piece, one of the pieces being fixed to the bottom and the other piece being fixed to the lid, each female piece having a pawl spring biased toward a closed position for retaining the male piece inside the female piece, each female piece including a spring biased plunger that causes a respective male piece to pop out of the female piece when the pawl moves to an open position,
    a handle located along the first side for controlling operation of the catch assemblies,
    a bar device connected to the handle for coordinating catch assembly operation, wherein the bar device has a notch for each catch assembly, each plunger having a protrusion that engages the respective notch in the bar device when the pawl is rotated to the open position, engagement of any one of the plunger protrusions with the respective notch preventing horizontal movement of the bar device.

2. The carrier of claim 1, wherein the second side of the box has a second set of catch assemblies, each set of catch assemblies being configured to operate as a releasable hinge allowing the box to be opened alternately from the first side and the second side.

3. The carrier of claim 1, wherein the bar device synchronizes opening and closing of the catch assemblies.

4. The carrier of claim 1, wherein the bar device has a prod portion for each catch assembly, each prod portion being aligned to urge the pawl in the respective female piece toward an open position allowing the male piece to exit the female piece.

5. The carrier of claim 1, wherein the bar device moves horizontally when the handle is rotated.

6. The carrier of claim 1, wherein the male piece has a spherical portion that is retained by the female piece when the lid is closed.

7. The carrier of claim 1, wherein each catch assembly is configured to function as a hinge when the male and female pieces are engaged.

* * * * *